(12) United States Patent
Watts et al.

(10) Patent No.: US 8,091,942 B2
(45) Date of Patent: Jan. 10, 2012

(54) RECREATIONAL VEHICLE WITH RAMP DOOR

(75) Inventors: Robert R. Watts, Bristol, IN (US); William G. Guerrant, Elkhart, IN (US); Renard G. Tubergen, Alto, MI (US)

(73) Assignee: Gumbo Product Development, Inc., Alto, MI (US)

( * ) Notice: Subject to any disclaimer, the term of this patent is extended or adjusted under 35 U.S.C. 154(b) by 0 days.

(21) Appl. No.: 12/592,131

(22) Filed: Nov. 19, 2009

(65) Prior Publication Data

US 2010/0123330 A1    May 20, 2010

Related U.S. Application Data

(60) Provisional application No. 61/199,698, filed on Nov. 19, 2008.

(51) Int. Cl.
*B62D 33/08* (2006.01)
*B60P 1/00* (2006.01)

(52) U.S. Cl. .......................................... 296/61; 414/537

(58) Field of Classification Search .............. 296/61, 296/146.8, 57.1; 414/537
See application file for complete search history.

(56) References Cited

U.S. PATENT DOCUMENTS

| | | |
|---|---|---|
| 3,997,932 A | 12/1976 | Artzberger |
| 4,056,203 A | 11/1977 | Meldahl et al. |
| 4,365,374 A | 12/1982 | Bennett |
| 4,398,315 A | 8/1983 | Driear et al. |
| 4,592,695 A | 6/1986 | McConnell |
| 4,827,548 A | 5/1989 | Hood |
| 5,040,936 A | 8/1991 | Rhea |
| 5,205,697 A | 4/1993 | Getty et al. |
| 5,380,142 A | 1/1995 | Hornung et al. |
| 5,598,595 A | 2/1997 | Flinchum |
| 5,775,713 A | 7/1998 | Peterson et al. |
| 6,135,532 A | 10/2000 | Martin |
| 6,179,545 B1 | 1/2001 | Petersen, Jr. et al. |
| 6,767,171 B2 | 7/2004 | Kelly |
| 7,143,869 B1 | 12/2006 | Chance |
| 2009/0079217 A1* | 3/2009 | Bakshi et al. ............... 296/61 |
| 2010/0037528 A1* | 2/2010 | Lambright ................. 296/61 |

FOREIGN PATENT DOCUMENTS

| JP | 63064843 | * 3/1988 |
|---|---|---|
| JP | 06227439 | * 8/1994 |

* cited by examiner

*Primary Examiner* — Joseph Pape

(74) *Attorney, Agent, or Firm* — Baker & Daniels LLP

(57) ABSTRACT

An embodiment of the invention includes a ramp mechanism configured for use in a recreational vehicle including a ramp portion and an actuation mechanism. The ramp portion is movable between a closed position and an open position. The actuation mechanism is configured to move the ramp portion between the closed position and the open position. The actuation mechanism includes a first mounting assembly, a second mounting assembly and an actuator connecting the first mounting assembly to the second mounting assembly.

6 Claims, 5 Drawing Sheets

RECREATIONAL VEHICLE WITH RAMP DOOR

This application claims the benefit of U.S. Provisional Patent Application Ser. No. 61/199,698 filed Nov. 19, 2008, the complete disclosure of which is hereby expressly incorporated by reference.

BACKGROUND

1. Field of the Invention

The present invention relates to a door configured for use on a recreational vehicle. In particular, the present invention relates to a door that may be opened and used as a ramp.

2. Description of Related Art

U.S. Pat. No. 4,398,315 discloses a lip lifting mechanism for a dock board. The dock board includes a ramp that pivots at its rear edge and is connected to a supporting structure. The ramp includes a lip connected to the forward edge of the ramp by a hinge. The ramp is movable between a downwardly hanging pendant position and an extended position. As the ramp moves from an inclined position to a horizontal position, a lip lifting mechanism raises the lip and supports the lip in an extended position. The lip lifting mechanism includes a connection that enables the lip lifting mechanism to yield and move out of the supporting engagement when a force is applied to the lip. In addition, the connection can be manually released in order to allow the lip to move into its pendant position.

U.S. Pat. No. 6,135,532 discloses a recreational vehicle and specialized tail gate and loading ramp. In one embodiment of the invention, the loading ramp assembly comprises first and second loading ramp panels and first, second, third and fourth pairs of cable supports, a cable drive assembly, a load cable and a cable linkage assembly. The first loading ramp panel is secured to the bottom portion of the access opening so as to pivot relative thereto. The second loading ramp panel is secured proximate the second transverse edge of the first panel so as to permit the second panel to pivot relative to the first panel. The cable drive assembly includes a drive cable and a cable translation mechanism. The load cable is secured between a pair of cables secured to the second panel. The cable linkage assembly is arranged to couple movement of the drive cable with movement of the load cable. The linkage assembly and the cable supports are arranged to distribute a uniform load over the load cable. The loading ramp assembly may be arranged in order to permit the first and second loading ramp panels to pivot in opposite directions between an extended position and retracted position, wherein the retracted position is characterized by substantially vertical alignment, and the extended position is characterized by decreasing degree of inclination from the first panel to the second panel.

U.S. Pat. No. 5,598,595 discloses a trailer ramp mechanism. The mechanism is provided for attachment to a pivotable ramp of a trailer in order to assist an operator in manually lifting and lowering of the ramp The mechanism allows the tension of a pair of coil springs positioned on a guide rod to be adjusted. A slotted spring stop permits the lateral positioning of the ramp to accommodate various wheel based equipment to be loaded on the trailer.

U.S. Pat. No. 6,767,171 discloses a recreational vehicle loading and unloading apparatus. The apparatus is configured to load and unload the vehicle from a truck. The apparatus comprises a vehicle receiving ramp and a lifting mechanism that engages with the underside of the ramp. The lifting mechanism is mounted to the rear of the truck and is selectively operable to move the ramp between a lowered inclined position and a raised position parallel to the longitudinal axis of the truck. The ramp is longitudinally mobile in the raised position between a foremost and a rearmost position. A locking mechanism also locks the ramp in the foremost or rearmost position as desired.

SUMMARY OF THE INVENTION

An embodiment of the invention includes a ramp mechanism configured for use in a recreational vehicle including a ramp portion and an actuation mechanism. The ramp portion is movable between a closed position and an open position. The actuation mechanism is configured to move the ramp portion between the closed position and the open position. The actuation mechanism includes a first mounting assembly, a second mounting assembly and an actuator connecting the first mounting assembly to the second mounting assembly.

In embodiments, the second mounting assembly is connected to the ramp portion. The first mounting assembly is connected to a floor of the recreational vehicle. The actuator is pivotally connected to the first mounting assembly and the second mounting assembly.

In embodiments, the first mounting assembly includes a first plate and a second plate arranged at a right angle to the first plate. The second assembly includes a first plate and a second plate arranged at a right angle to the first plate.

In embodiments, the ramp mechanism further includes a plurality of hinges configured to connect the ramp portion to the recreational vehicle. The ramp mechanism may further include a frame defining an opening and configured to encompass the ramp portion. The hinges may be connected to the ramp portion and the frame.

An embodiment of the invention includes a ramp mechanism configured to cover an opening formed in a wall of a body portion of a recreational vehicle. The ramp mechanism includes a ramp portion and an actuation mechanism. The ramp mechanism may be connected to a frame defining the opening. The actuation mechanism is connected to the body portion and the ramp portion.

BRIEF DESCRIPTION OF THE DRAWINGS

Further details are illustrated in the exemplary embodiments described below making reference to the appended drawings.

Figure 1:
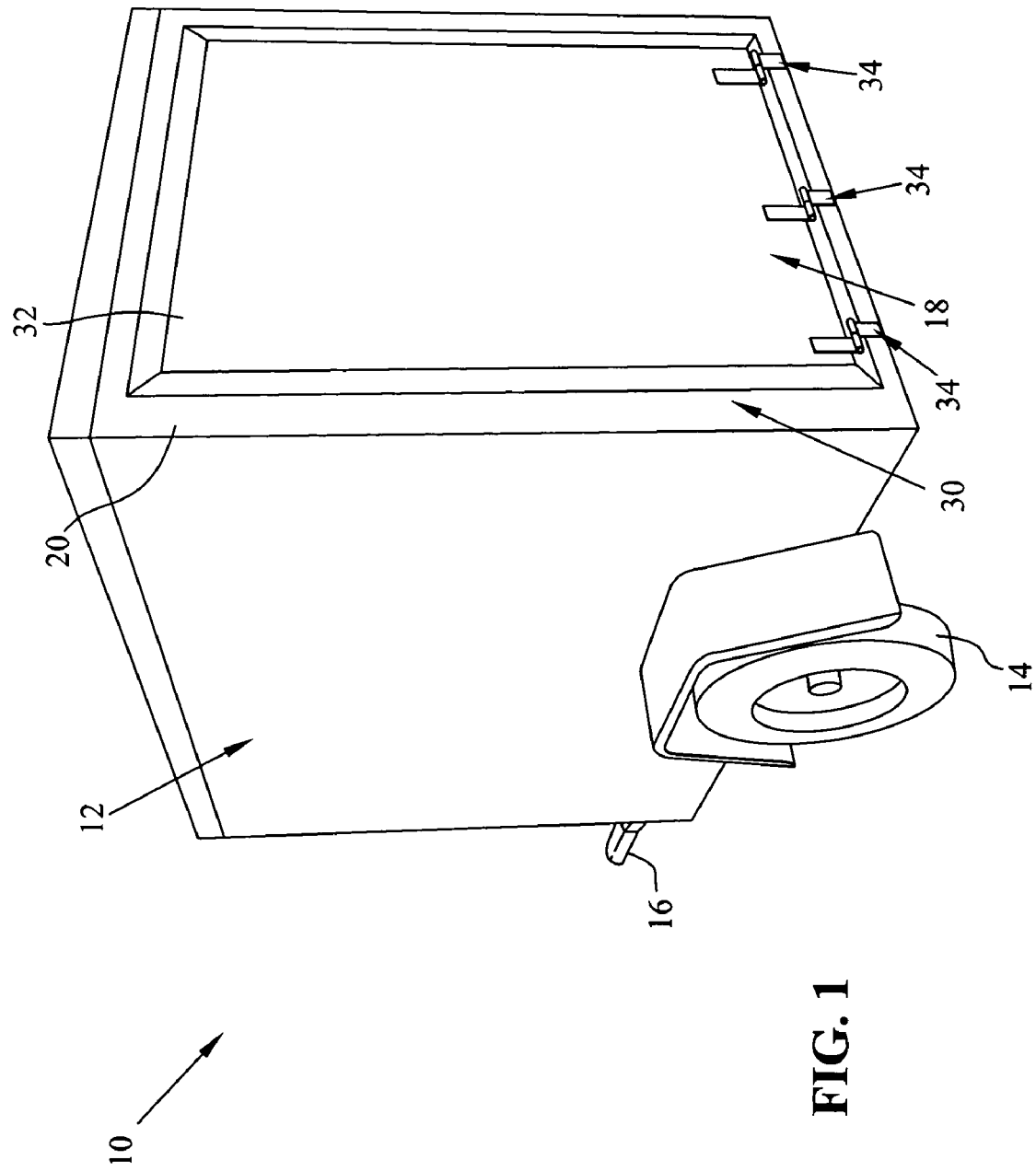
FIG. 1 shows a rear perspective view of a recreational vehicle embodying an example of the present invention.
Figure 2:
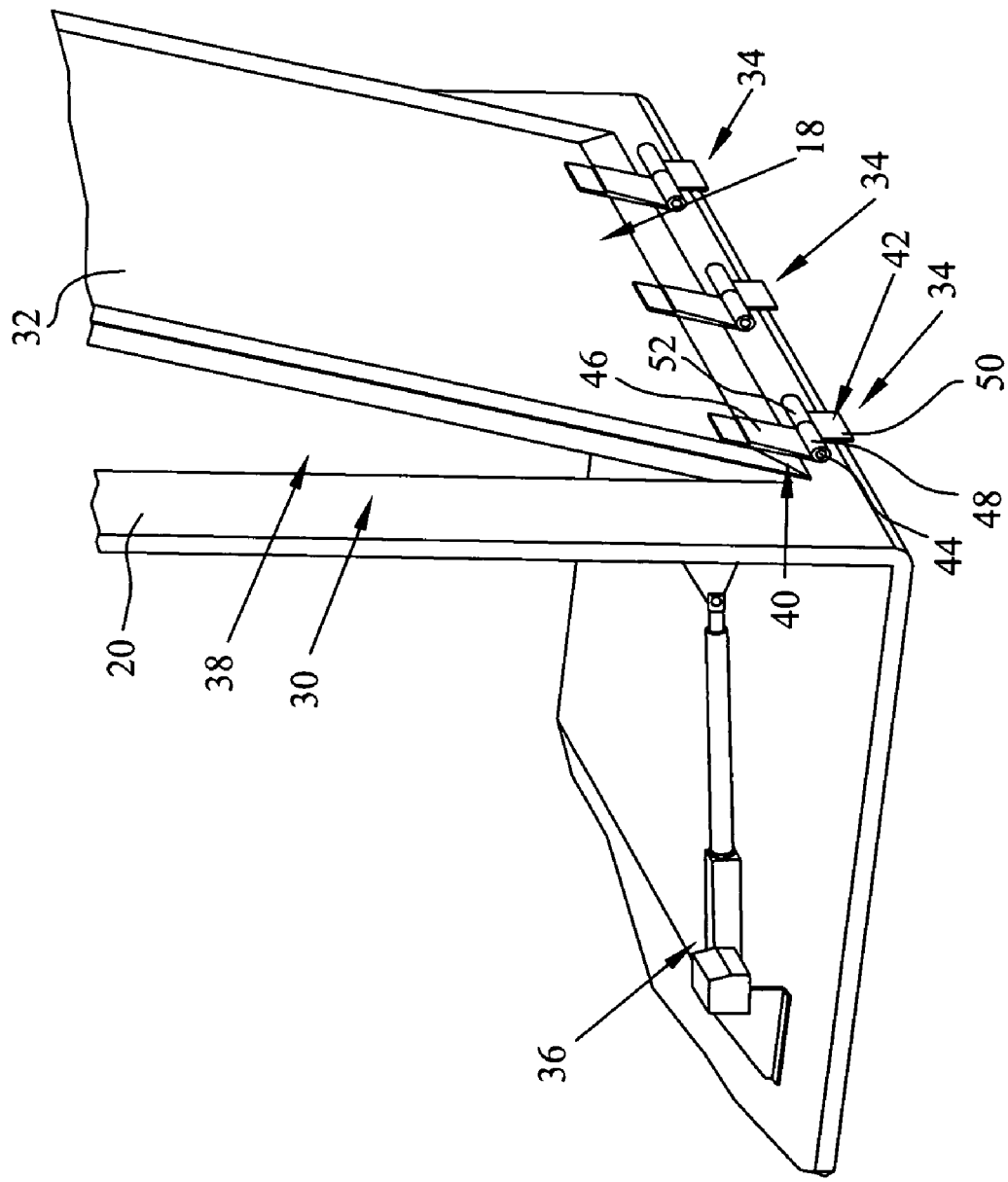
FIG. 2 is a magnified view of a portion of the recreational vehicle depicted in FIG. 1 with a portion of a wall removed for illustrative purposes.
Figure 3:
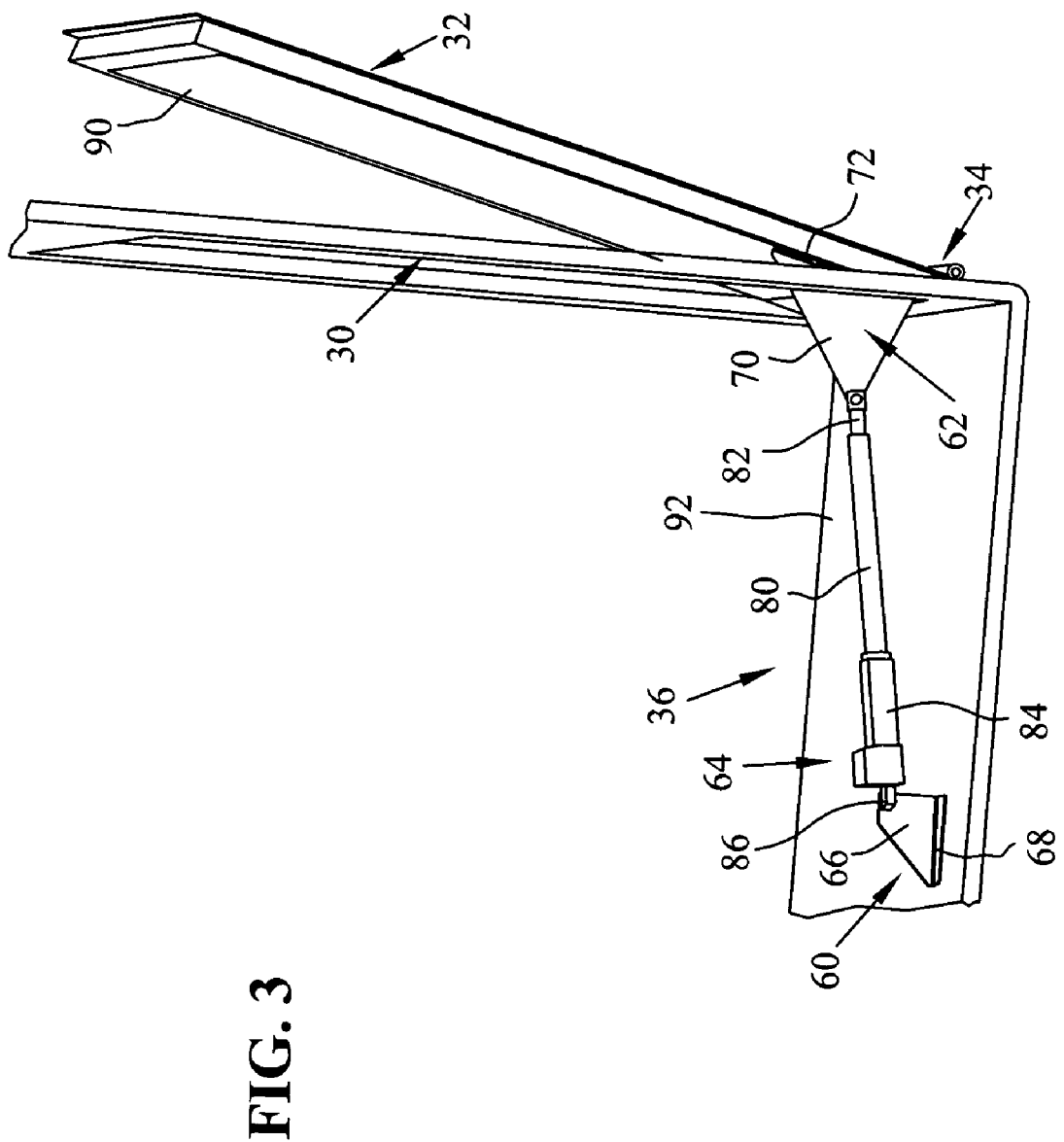
FIG. 3 is a side view of a portion of the recreational vehicle depicted in FIG. 1 with a portion of a wall removed for illustrative purposes.
Figure 4:
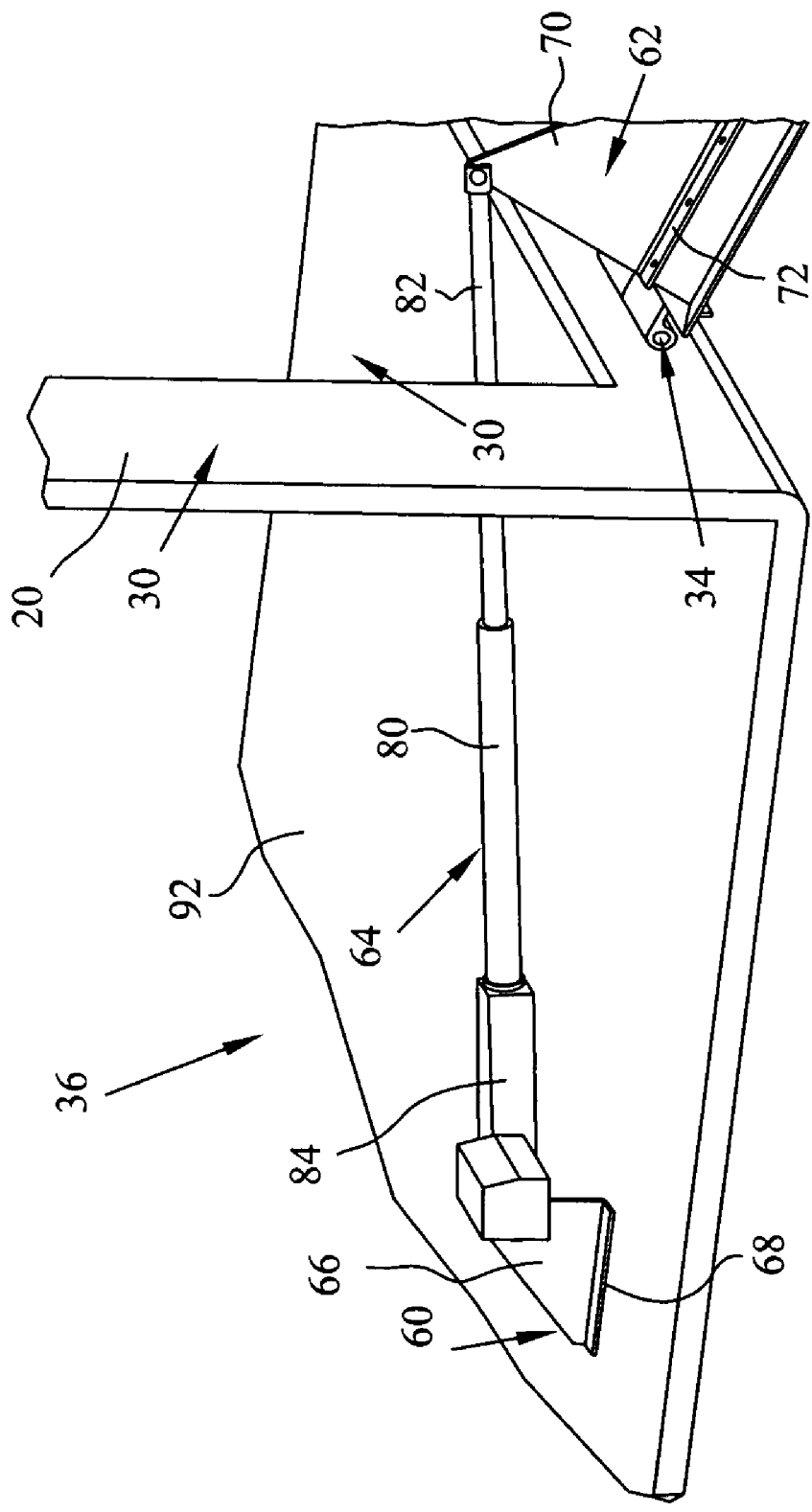
FIG. 4 is a magnified view of a portion of the recreational vehicle depicted in FIG. 1 with a portion of a wall removed for illustrative purposes and the ramp portion in the open configuration.

Although the drawings represent embodiments of various features and components according to the present invention, the drawings are not necessarily to scale and certain features may be exaggerated in order to better illustrate and explain the present invention. The exemplification set out herein illustrates an embodiment of the invention, and such exemplification is not to be construed as limiting the scope of the invention in any manner.

DETAILED DESCRIPTION

For the purposes of promoting an understanding of the principles of the invention, reference will now be made to the embodiment illustrated in the drawings, which is described below. It will nevertheless be understood that no limitation of the scope of the invention is thereby intended. The invention includes any alterations and further modifications in the illustrated device and described method and further applications of the principles of the invention, which would normally occur to one skilled in the art to which the invention relates. Moreover, the embodiment was selected for description to enable one of ordinary skill in the art to practice the invention.

FIG. 1 depicts a perspective view of a recreational vehicle, generally indicated by numeral 10. In the depicted embodiment, vehicle 10 is a towable vehicle including a body portion, indicated by numeral 12, a ground engaging support 14 and a hitch 16. Body portion 12 may be made of any suitable material and may be manufactured in any suitable manner as would be understood by one with skill in the art. In the depicted embodiment, the body portion 12 includes a ramp assembly generally indicated by numeral 18.

Ground engaging support 14 may be any suitable support mechanism known in the art. For example, in the depicted embodiment, the ground engaging support 14 may comprise two tires spaced on either side of the body portion 12 and mounted to an axle. In other embodiments, the ground engaging support 14 may comprise a plurality of axles support a plurality of wheels on each side of the body portion 12.

Hitch 16 may be any suitable hitch known in the art that allows vehicle 10 to be attached to a tow vehicle in a known manner. For example, in the depicted embodiment, hitch 16 is configured to attach to the ball of a hitch of a tow vehicle in a known manner. It should be noted that in embodiments of the invention, body portion 12 may be configured so that hitch 16 may be a common fifth wheel type of hitch that is generally configured to connect to the flat bed portion of a pickup truck.

With reference now to FIGS. 1 through 5, ramp assembly 18 includes a frame portion 30, a ramp portion 32, a plurality of hinges, each indicated by numeral 34 and an actuation mechanism indicated by numeral 36. Frame portion 30 defines an opening 38. In the depicted embodiment, frame portion 30 is depicted as a separate component. In embodiments, the frame portion 30 may comprise the back panel 20 of the body portion 12 and be defined by opening 38. Frame portion 30 may be manufactured from any suitable material.

Ramp portion 32 comprises a substantially planar movable member. Ramp portion 32 may be manufactured from any suitable material, such as wood, metal, etc. In embodiments of the invention, ramp portion 32 may include reinforcements configured to ensure the ramp portion 32 is capable of supporting a motorcycle, four-wheeler, or similar type of vehicle. It should be noted that in embodiments of the invention, the ramp portion 32 may be manufactured from a composite material or other material capable of supporting a toy. In addition, ramp portion 32 may have any suitable configuration known in the art.

In the depicted embodiment, the hinges 34 each include a first member 40, a second member 42 and a pin 44. The first member 40 includes a plate 46 and a cylindrical member 48, and the second member 42 includes a plate 50 and a cylindrical member 52. The plate 46 may be manufactured from any material capable of supporting ramp portion 32, such as steel, for example. In embodiments, the cylindrical member 48 may be manufactured from the identical or a similar material. The plate 46 and cylindrical member 48 may be joined in any suitable manner, such as via welding, for example. It should be noted that in embodiments, the plate 46 and the member 48 may be manufactured from a single piece of material in a unitary manner. The plate 50 and the cylindrical member 52 may also be manufactured form similar materials. In addition, the plate 50 and member 52 may be attached in any suitable manner, such as via welding. In addition, the plate 50 and member 52 may be formed from a single piece of material in a unitary manner. It should be noted that the cylindrical members 48, 52 may be attached to the plates 46, 50 in an offset manner.

Pin 44 may be manufactured from any suitable material, such as steel, capable of supporting ramp portion 32. In the depicted embodiment, pin 44 is sized to be received within the cylindrical members 48, 52. In addition, the pin 44 may be sized to be received by the members 48, 52. In addition, pin 44 may be retained within the members 48, 52 in any suitable manner.

The hinges 34 may be assembled by inserting pin 44 into the cylindrical members 48, 52 of the first member 40 and the second member 42, respectively. Pin 44 may be inserted into the cylindrical members 48, 52 in any suitable manner. The pin 44 is configured to allow the members 48, 52 to rotate about the pin 44, and accordingly, the first member 40 may move about pin 44 with respect to the second member 42 by way of a pivoting rotation.

Referring still to FIGS. 2 through 5, actuation mechanism 36 includes a first mounting assembly, indicated by numeral 60, a second mounting assembly, indicated by numeral 62, and an extension assembly, indicated by numeral 64. In the depicted embodiment, first mounting assembly 60 includes a first plate 66 and a second plate 68. The plates 66, 68 may be manufactured from any suitable material such as steel, for example. First plate 66 may be attached to second plate 68 in any suitable manner such as by welding. In embodiments, the plates 66, 68 may be formed from a single piece of material that is bent. In the depicted embodiment, plate 66 is arranged at a right angle with respect to plate 68.

In the depicted embodiment, second mounting assembly 62 has a configuration identical to first mounting assembly 60. It should be noted that the first mounting assembly 60 need not be identical to second mounting assembly 62. In the depicted embodiment, second mounting assembly 62 includes a first plate 70 and a second plate 72. The first mounting assembly 60, the first plate 70 and the second plate 72 are arranged at a substantially right angle. The plates 70, 72 may be attached in any suitable manner, such as via a weld, or formed as a single unitary piece.

In the depicted embodiment, extension assembly 64 includes a first member 80, a second member 82 and an actuator 84. First member 80 is substantially hollow and configured to receive second member 82. In addition, second member 82 is configured to allow for translation of second member 82 with respect to first member 80.

Actuator 84 is configured to drive second member 82 into translational movement with respect to first member 80. Actuator 84 may be any type of conventional actuator known in the art. In addition, actuator 84 may facilitate movement of second member 82 in any conventional manner, such as by way of a pneumatic or a hydraulic mechanism. In embodiments, the actuator 84 may be configured to allow second member 82 to translate into an infinite number of positions with respect to first member 80. It should be noted that the actuator 84 may be controlled in any suitable manner. For example, in embodiments, the actuator 84 may be controlled with a switch (not shown) connected to the body portion 12. The switch may be connected to the actuator 84 in any suitable manner, such as with wiring.

Referring still to FIGS. 2 through 5, when assembling the actuation mechanism 36, the second member 82 is pivotally connected to the second mounting assembly 62 in any suitable manner. For example, a pin (not shown) may be inserted into apertures (not shown) formed in the second mounting assembly 62 and in the end of the second member 82.

Actuator 84 may be attached to the first mounting assembly 60 in any suitable manner allowing the actuator 84 to pivot with respect to first mounting assembly 60. For example, as shown in the embodiment depicted in FIG. 3, actuator 84 may include a member 86 extending in the direction opposite the first and second members 80, 82. In embodiments, the member 86 may include an aperture (not shown) configured to receive a pin (not shown). The pin may be inserted into an aperture (not shown) formed in the first plate 66 of the first mounting assembly 60. The pin may be configured so that the pin may be retained in the apertures in any suitable manner allowing the actuator 84 to pivot about the pin with respect to the first plate 66 of the first mounting assembly 60.

Now that the components of the depicted embodiment of the invention have been described, the assembly of the depicted embodiment of the invention will be described. It should be noted that the following description is being provided for exemplary purposes only and the steps may be altered in any suitable manner without altering the spirit of the present invention.

In the present embodiment, hinges 34 connect the frame portion 30 to the ramp portion 32. In particular, the plate 46 of the first member 40 may be connected to the frame portion 30, and the plate 50 of the second member 42 may be connected to the ramp portion 32. In addition, the second plate 72 of the second mounting assembly 62 is connected to the inner surface 90 of the ramp portion 32, and second plate 68 is be connected to the floor 92. The plates 68, 72 may be connected to the floor 92 and inner surface 90, respectively, in any suitable manner, such as with a plurality of fasteners, for example.

In operation, actuator 84 may be used to control the relative position of the second member 82 with respect to the first member 80. For example, actuator 84 may be activated to propel second member 82 outward from first member 80, and actuator 84 may also be activated in order to withdraw second member 82 into first member 80.

Figure 5:
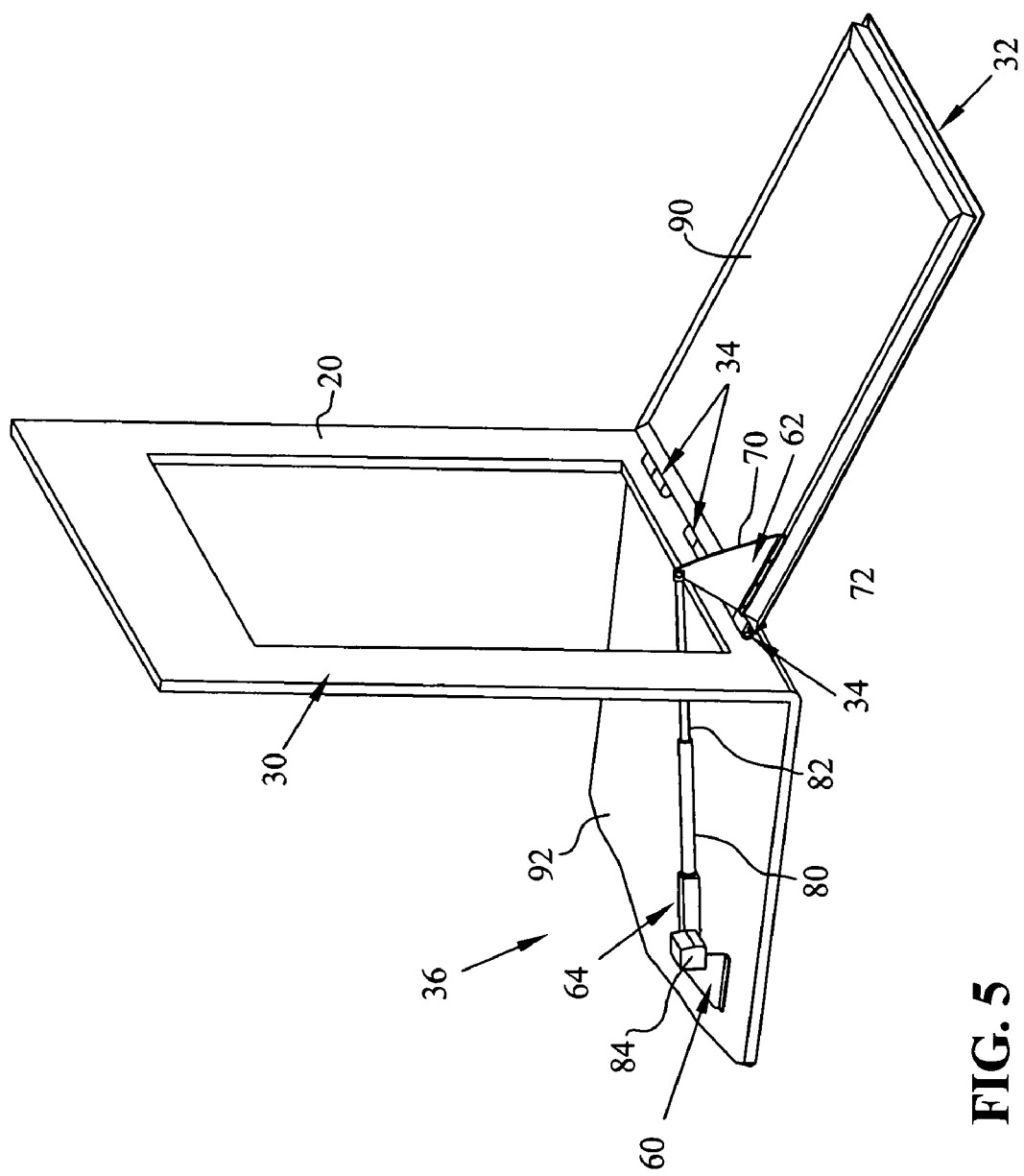
FIG. 5 is a side view of a portion of the recreational vehicle depicted in FIG. 1 with a portion of a wall removed for illustrative purposes.

In the depicted embodiment, the pivoting connection between second member 82 and second mounting assembly 62 and the pivoting connection between actuator 84 and first mounting assembly 60, allows the ramp portion 32 to move from a substantially vertical orientation to at least a substantially horizontal position as the second member 82 moves from a retracted position to an extended position with respect to the first member 80. It should be noted that in the depicted embodiment, when the second member 82 is fully extended from the first member 80, the ramp portion 32 travels past the horizontal, as shown in FIG. 5. Furthermore, it should be noted that in the depicted embodiment, the configuration of the hinges 34 allow the ramp portion 32 to travel greater than 90 degrees as the second member 82 moves from the fully retracted position to the fully extended position. In addition, the actuator 84 should have sufficient power to withdraw the second member 82 into first member 80 while also lifting the ramp portion 32 from the open position depicted in FIG. 5 to the closed position depicted in FIG. 1.

While this invention has been described as having exemplary designs, the present invention may be further modified within the spirit and scope of the disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A ramp mechanism configured for use in a recreational vehicle including:
    a ramp portion movable between a closed position and an open position, the ramp portion having an interior surface and an exterior surface, the interior surface being on the interior of the recreational vehicle when the ramp is in the closed position;
    a floor of the recreational vehicle having an internal surface and an external surface; and
    a power operated actuation mechanism configured to drive the ramp portion between the closed position and the open position, the actuation mechanism including a first mounting assembly mounted to the internal surface of the floor, a second mounting assembly connected to the ramp portion and mounted to the interior surface thereof and an actuator connecting the first mounting assembly to the second mounting assembly, the actuator being pivotally connected to the first mounting assembly and the second mounting assembly.

2. The ramp mechanism as set forth in claim 1, wherein the first mounting assembly includes a first plate and a second plate arranged at a right angle to the first plate.

3. The ramp mechanism as set forth in claim 1, wherein the second assembly includes a first plate and a second plate arranged at a right angle to the first plate.

4. The ramp mechanism as set forth in claim 1, further including a plurality of hinges configured to connect the ramp portion to the recreational vehicle.

5. The ramp mechanism as set forth in claim 4, further including a frame defining an opening and configured to encompass the ramp portion.

6. The ramp mechanism as set forth in claim 5, wherein the hinges are connected to the ramp portion and the frame.

* * * * *